(12) United States Patent
Chuang (10) Patent No.: US 9,304,541 B2
(45) Date of Patent: Apr. 5, 2016

(54) ELECTRONIC DEVICE

(71) Applicant: Acer Incorporated, New Taipei (TW)

(72) Inventor: Huei-Ting Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 265 days.

(21) Appl. No.: 14/052,769

(22) Filed: Oct. 13, 2013

(65) Prior Publication Data

US 2015/0055291 A1  Feb. 26, 2015

(30) Foreign Application Priority Data

Aug. 22, 2013 (TW) .............................. 102130007 A (51) Int. Cl.
*G06F 1/16* (2006.01)
(52) U.S. Cl.
CPC .............. *G06F 1/1622* (2013.01); *G06F 1/162* (2013.01)
(58) Field of Classification Search
CPC ... H04M 1/0227; G06F 1/1622; G06F 1/1624
USPC .......................... 361/679.27; 455/575.1–575.4
See application file for complete search history.

(56) References Cited

U.S. PATENT DOCUMENTS

| 6,829,139 | B1 * | 12/2004 | Duarte ................ | H04M 1/0237 361/679.02 |
| 7,092,246 | B2 * | 8/2006 | Tanaka .................. | G06F 1/1613 361/679.27 |
| D559,818 | S * | 1/2008 | Miyazaki ............... | D14/138 AB |
| D574,801 | S * | 8/2008 | Arnold .................... | D14/138 AB |
| 7,577,466 | B2 * | 8/2009 | Kim .................... | H04M 1/0247 379/433.01 |
| 7,797,026 | B2 * | 9/2010 | Lin ....................... | H04M 1/021 455/556.1 |
| 7,970,444 | B2 * | 6/2011 | Thornton ............. | H04M 1/0239 379/433.05 |
| 8,005,516 | B2 * | 8/2011 | Ohki .................... | H04M 1/0247 455/550.1 |
| 8,102,283 | B2 * | 1/2012 | Lin ..................... | H04M 1/0227 341/22 |
| 8,250,712 | B2 * | 8/2012 | Kim ..................... | H04M 1/0212 16/361 |
| 8,471,820 | B2 * | 6/2013 | Holman, IV .......... | G06F 1/1622 345/169 |
| 8,630,089 | B2 * | 1/2014 | Holman, IV ........ | H04M 1/0227 361/679.56 |
| 8,662,769 | B2 * | 3/2014 | Griffin .................. | G06F 3/0221 400/472 |
| 2003/0132863 | A1 * | 7/2003 | Lahr ...................... | G06F 1/1622 341/22 |
| 2004/0203527 | A1 * | 10/2004 | Matsumoto ........... | H04M 1/021 455/90.3 |
| 2004/0206876 | A1 * | 10/2004 | Kato .................... | H04M 1/0237 248/349.1 |
| 2005/0054393 | A1 * | 3/2005 | Fagerstrom ........... | G06F 1/1622 455/575.1 |
| 2006/0046797 | A1 * | 3/2006 | Chen .................... | H04M 1/0237 455/575.4 |
| 2006/0237209 | A1 * | 10/2006 | Horinouchi ............. | A63F 13/08 174/50 |

(Continued)

*Primary Examiner* — Adrian S Wilson
(74) *Attorney, Agent, or Firm* — Jianq Chyun IP Office (57) ABSTRACT

An electronic device including a first body, a second body, and a linking-up member is provided. The second body connected to the first body is capable of being opened and closed relative to the first body. The second body has a first and second restriction member. The linking-up member is assembled to the first body. Two opposite ends of the linking-up member is coupled to the first restriction member and the second restriction member respectively, where the first restriction member provides a first stroke and the second restriction member provides a second stroke to the linking-up member. One of the first stroke and the second stroke is a linear path and another one is a curved path. When the first body is expanded relative to the second body, the liking-up member combines the first stroke and the second stroke to drive the second body rotating relative to the first body.

16 Claims, 7 Drawing Sheets

(56) References Cited

U.S. PATENT DOCUMENTS

| | | | | |
|---|---|---|---|---|
| 2007/0082718 A1* | 4/2007 | Yoon | ............ | H04M 1/0237 455/575.4 |
| 2007/0142101 A1* | 6/2007 | Seshagiri | ............ | G06F 1/1624 455/575.4 |
| 2007/0232368 A1* | 10/2007 | Feightner | ............ | H04M 1/0235 455/575.1 |
| 2007/0254730 A1* | 11/2007 | Kim | ............ | H04M 1/0241 455/575.4 |
| 2008/0004083 A1* | 1/2008 | Ohki | ............ | H04M 1/0212 455/566 |
| 2009/0273888 A1* | 11/2009 | Oshima | ............ | A63F 13/08 361/679.01 |
| 2010/0197371 A1* | 8/2010 | Hsu | ............ | H04M 1/0233 455/575.4 |
| 2011/0248933 A1* | 10/2011 | Griffin | ............ | G06F 1/1622 345/173 |

* cited by examiner

FIG. 7

ELECTRONIC DEVICE

CROSS-REFERENCE TO RELATED APPLICATION

This application claims the priority benefits of Taiwan application serial no. 102130007, filed on Aug. 22, 2013. The entirety of the above-mentioned patent application is hereby incorporated by reference herein and made a part of this specification.

BACKGROUND

1. Technical Field

The invention relates to an electronic device. Particularly, the invention relates to an electronic device capable of driving a first body to rotate relative to a second body through a linking-up member.

2. Related Art

Along with development of semiconductor component and display technology, electronic devices are continuously developed towards a trend of miniaturization, multi-function and portability, and the commonly used portable electronic devices include personal digital assistants (PDAs), mobile phones, notebook computers, etc. Taking a notebook computer as an example, since it has same functions as that of a desktop computer, and a volume and a weight thereof are decreased to facilitate the user carrying it around, the notebook computer has become an indispensable portable tool of some user.

Generally, the notebook computer takes a rotation shaft between a display unit and a device body as a motion mechanism there between, where the display unit is oriented to a landscape mode, so that after the display unit is expanded relative to the device body through the rotation shaft, a display direction of the display unit viewed by the user also presents the landscape mode. However, when the user edits a document or browses a webpage, the aforementioned setting method cannot provide the user with a preferred display ratio, and the user has to scroll the display page back and forth or greatly decrease the display ratio of the display page in order to capture the entire information, which increases operation inconvenience and visual discomfort.

SUMMARY

The invention is directed to an electronic device, in which after a first body and a second body are opened, the first body is capable of changing between a first state and a second state relative to the second body.

The invention provides an electronic device including a first body, a second body, a linking-up member and a restriction member. The second body connected to the first body is capable of being opened and closed relative to the first body. The second body has a sliding slot. The linking-up member is fixed to the first body. The linking-up member has a shaft portion pivoted to the sliding slot. The first body rotates along a rotation shaft of the shaft portion relative to the second body along with the linking-up member and moves along the sliding slot. The restriction member is assembled to the second body. The linking-up member is movably coupled to the restriction member according to a contour thereof, where the first body is applied with an external force to rotate about the rotation shaft along with the linking-up member, so as to drive the linking-up member to move relative to the restriction member, and drive the shaft portion to slide back and forth along the sliding slot, such that the first body is transformed between a first state and a second state relative to the second body.

The invention provides an electronic device including a first body, a second body and a linking-up member. The second body connected to the first body is capable of being opened and closed relative to the first body. The second body has a first restriction member and a second restriction member. The linking-up member is assembled to the first body. Two opposite ends of the linking-up member are respectively coupled to the first restriction member and the second restriction member, where the first restriction member provides a first stroke and the second restriction member provides a second stroke to the linking-up member respectively. One of the first stroke and the second stroke is a linear path and another one is a curved path. When the first body is opened relative to the second body, the liking-up member combines the first stroke and the second stroke to drive the first body to rotate relative to the second body.

According to the above descriptions, in the electronic device of the invention, the linking-up member is configured on the first body, where the linking-up member is respectively coupled to the first restriction member and the second restriction member on the second body. The first restriction member provides a first stroke of a linear path and the second restriction member provides a second stroke of a curved path to the linking-up member respectively. When the first body is opened relative to the second body, the liking-up member combines the first stroke and the second stroke to drive the first body to rotate relative to the second body, and makes the first body to transform between a first state, for example, a landscape mode and a second state, for example, a portrait mode relative to the second body, so as to provide the user a preferred display ration, and accordingly improve operation convenience and decrease the visual discomfort.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
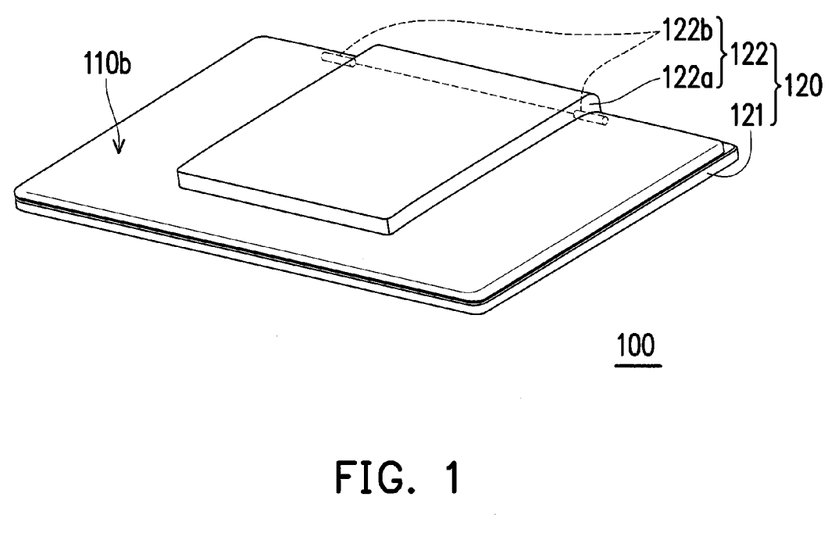
FIG. 1 is a schematic diagram of an electronic device according to an embodiment of the invention.
Figure 2:
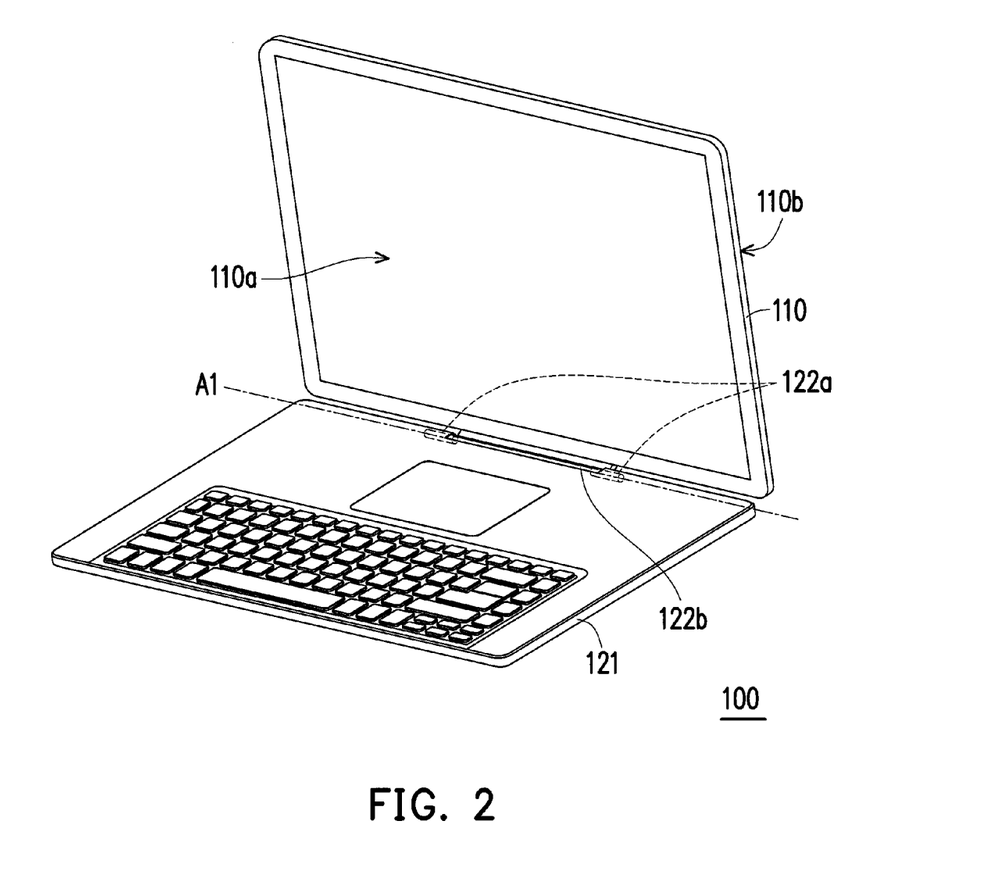
FIG. 2 is a schematic diagram of the electronic device of FIG. 1 after expansion.

FIG. 1 is a schematic diagram of an electronic device according to an embodiment of the invention. FIG. 2 is a schematic diagram of the electronic device of FIG. 1 after expansion. Referring to FIG. 1 and FIG. 2, in the present embodiment, the electronic device 100 is, for example, a notebook computer, which includes a first body 110 and a second body 120, where the first body 110 is, for example, a display element of the notebook computer, which has a display surface 110a and a back surface 110b opposite to each other, and the second body 120 includes a host 121 and a support plate 122, where the support plate 122 is connected between the back surface 110b of the first body 110 and the host 121.

In detail, the support plate 122 includes a main body 122a and a shaft 122b, where the shaft 122b is pivoted between the main body 122a and the host 121. In this way, the second body 120 connected to the first body 110 can be opened and closed relative to the first body 110. Namely, the first body 110 and the second body 120 can be rotated relative to each other about an axial direction A1 through the shaft 122b, so as to adjust an expanding angle between the first body 110 and the second body 120.

Figure 3:
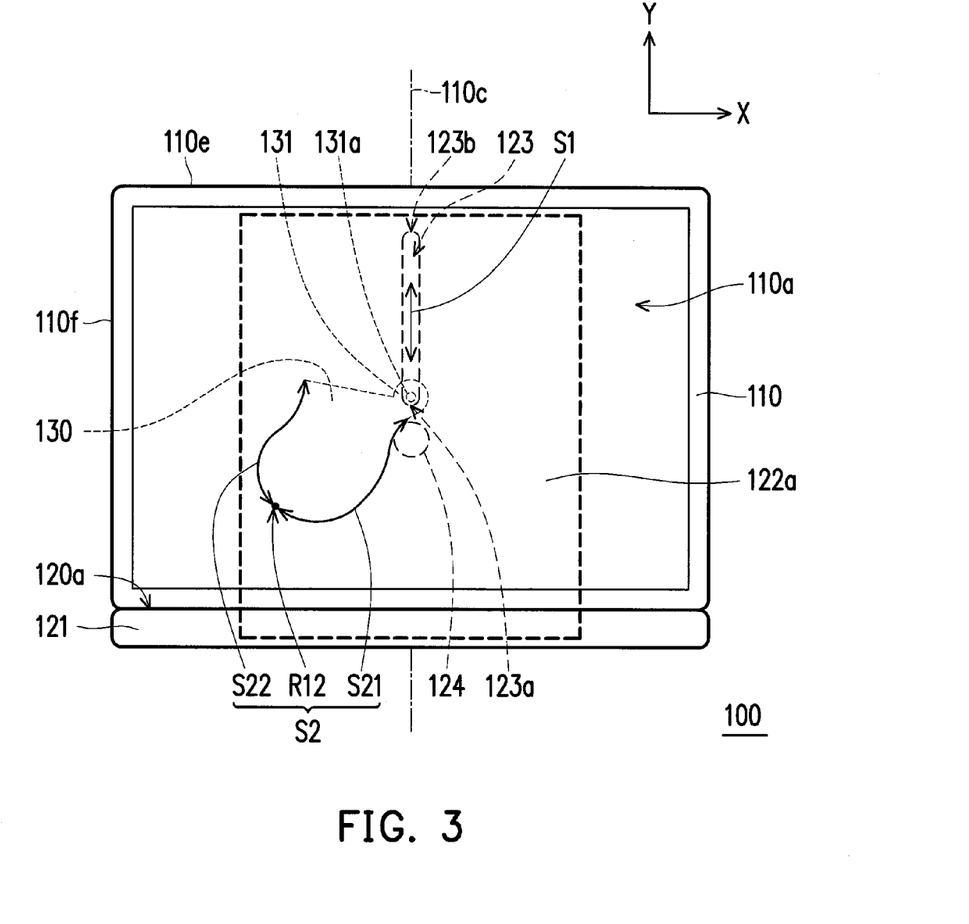
FIG. 3 is a front view of the electronic device of FIG. 2.

FIG. 3 is a front view of the electronic device of FIG. 2. FIG. 4-FIG. 7 are schematic diagrams illustrating a process that the electronic device of FIG. 3 is transformed from a first state to a second state, where the first state refers to a state of the electronic device 100 as that shown in FIG. 3, and the second state refers to a state of the electronic device 100 as that shown in FIG. 7. Referring to FIG. 3 to FIG. 7, in the present embodiment, the second body 120 has a first restriction member 123 and a second restriction member 124, where the first restriction member 124 is a sliding slot, which is located on the main body 122a of the support plate 122. The second restriction member 124 is a roller pivoted to the main body 122a, where orthogonal projections of the first restriction member 123 and the second restriction member 124 on the first body 110 are permanently located on a central axis 110c of the first body 110. On the other hand, the electronic device 100 further includes a linking-up member 130, which is assembled to the first body 110, and two opposite ends of the linking-up member 130 are respectively coupled to the first restriction member 123 and the second restriction member 124.

In detail, the linking-up member 130 fixed to the first body 110 is a cam, which has a shaft portion 131 movably pivoted to the first restriction member 123, and the linking-up member 130 is movably coupled to the second restriction member 124 according to a contour thereof. In this way, as the linking-up member 130 moves back and forth in the sliding slot through the shaft portion 131, the second restriction member 124 moves along the contour of the linking-up member 130, where the first restriction member 123 provides the linking-up member 130 and the first body 110 with a first stroke S1, which is a linear path that the linking-up member 130 and the first body 110 move up and down relative to the second body 120. The second restriction member 124 provides a second stroke S2 to the linking-up member 130, in detail, at least a part of the curved contour of the linking-up member 130 movably leans against the second restriction member 124 to form the second stroke S2 of the curved path suitable for moving relative to the second restriction member 124. In FIG. 3 to FIG. 7, a solid curve is used to directly illustrate the second stroke S2 on a dot line contour of the linking-up member 130 for better recognition.

When the first body 110 is opened relative to the second body 120, the first body 110 is adapted to be applied with an external force to rotate about a rotation shaft 131a (shown in FIG. 3, the rotation shaft 131a is perpendicular to an X-Y plane) along with the linking-up member 130, so as to drive the linking-up member 130 to move relative to the second restriction member 124, and drive the shaft portion 131 to slide back and forth along the first restriction member 123, such that the first body 110 is transformed between the first state and the second state relative to the second body 120. Namely, when the first body 110 is opened relative to the second body 120, the liking-up member 130 combines the first stroke S1 and the second stroke S2 to drive the first body 110 to rotate relative to the second body 120, so as to achieve an effect of rotating the first body 110 relative to the second body 120.

In detail, the second stroke S2 formed through the relative movement of the linking-up member 130 and the second restriction member 124 includes a first segment S21 and a second segment S22 adjacent to each other and an inflection point R12 between the first segment S21 and the second segment S22, and the first restriction member 123 has a first end 123a adjacent to the second restriction member 124 and a second end 123b away from the second restriction member 124. Moreover, after the first body 110 being opened relative to the second body 120, the first restriction member 123 is perpendicular to and located above a surface 120a of the host 121 of the second body 120, where the first end 123a is located between the surface 120a and the second end 123b, and the second restriction member 124 is located between the surface 120a and the first end 123a. Therefore, when the linking-up member 130 rotates about the rotation shaft 131a, and the second restriction member 124 moves from the first segment S21 to the inflection point R12 relative to the linking-up member 130, the shaft portion 131 moves from the first end 123a to the second end 123b, and the first body 110 is rotated from the first state to an intermediate state relative to the second body 120 (as that shown in FIG. 5). It should be noticed that the first body 110 of the present embodiment has a rectangular contour, so that when the first body 110 is in the intermediate state relative to the second body 120 (as that shown in FIG. 5), a diagonal 110d of the first body 110 is perpendicular to the surface 120a of the second body 120. Then, when the linking-up member 130 continually rotates about the rotation shaft 131a, and the second restriction member 124 moves from the inflection point R12 to the second segment S22 relative to the linking-up member 130, the shaft portion 131 moves from the second end 123b to a position between the first end 123a and the second end 123b, and the first body 110 is rotated from the intermediate state (as that shown in FIG. 5) to the second state relative to the second body 120.

Figure 5:
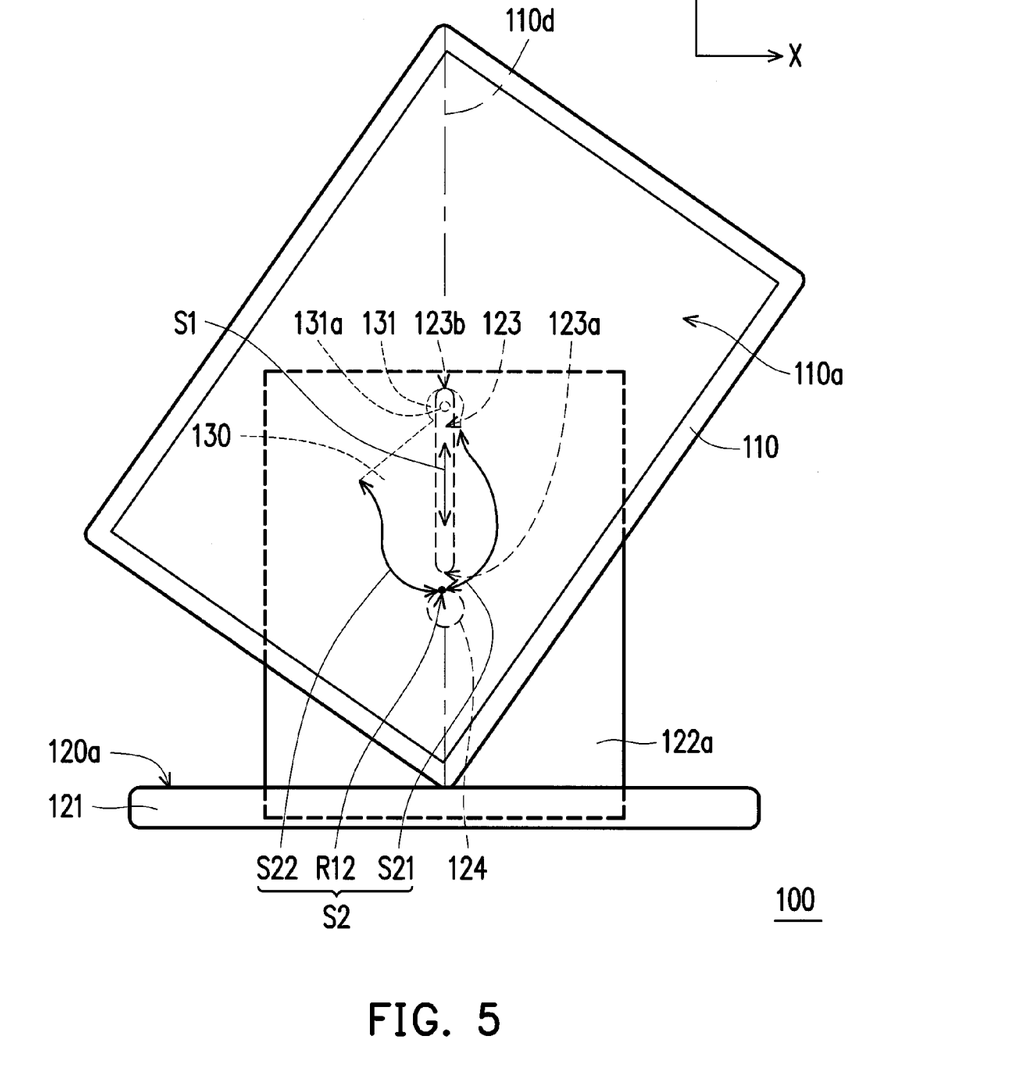
Figure 6:
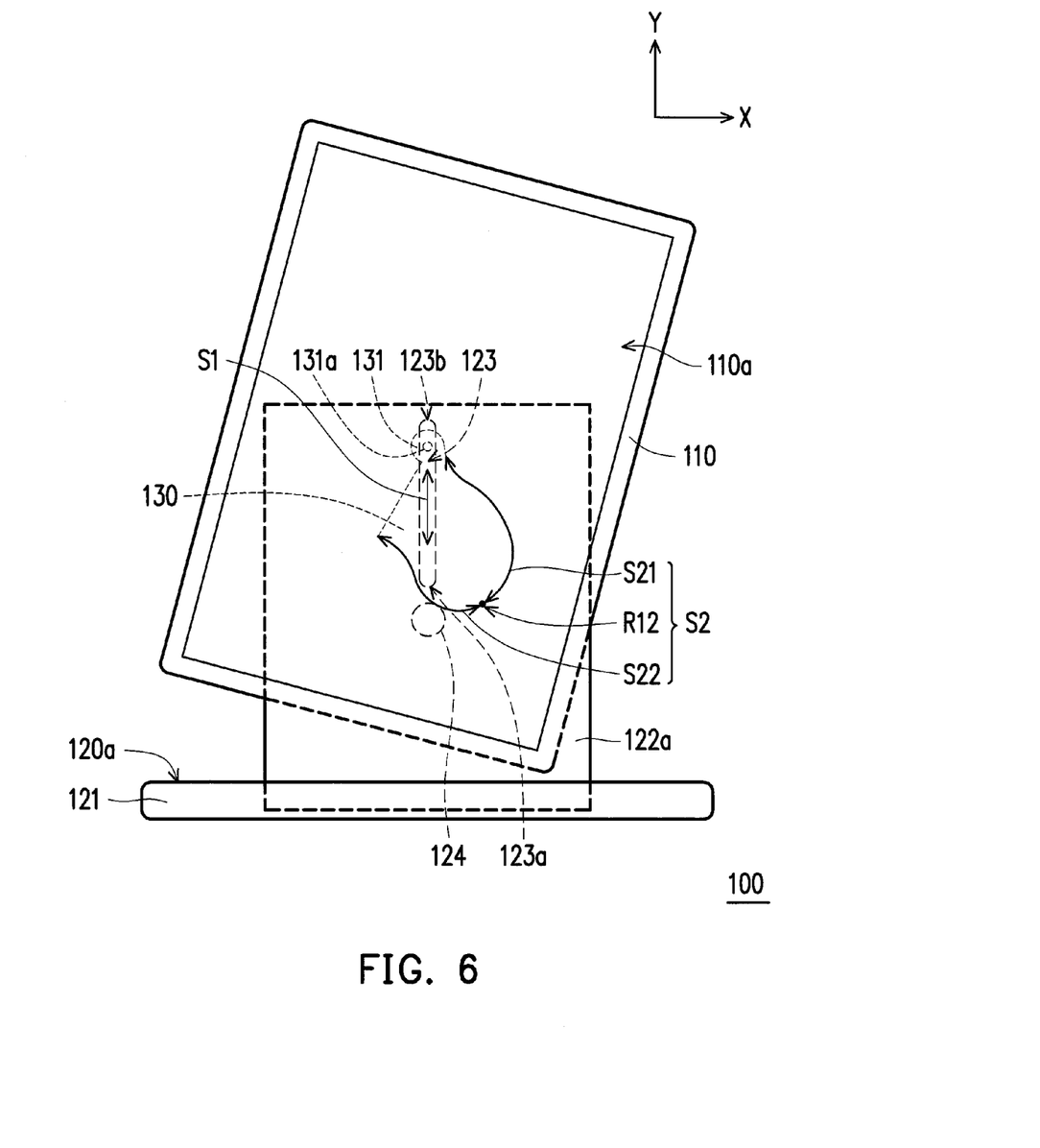

It should be noticed that in the present embodiment, a center of gravity of the first body 110 is located right at a center point of the diagonal 110d, so that when the first body 110 is rotated relative to the second body 120 to the state as that shown in FIG. 5, the inflection point R12 of the linking-up member 130 is located right on the diagonal 110d. In this way, in collaboration with the linking-up member 130 and the second restriction member 124, the user is only required to exert a smaller force on the first body 110 to drive the second restriction member 124 to move towards the first segment S21 or the second segment S22, and then due to shift of the center of gravity of the first body 110, the first body 110 can drive the second restriction member 124 to move to the first segment S21 or the second segment S22 with its dead weight, so as to achieve an effort saving effect.

Figure 4:
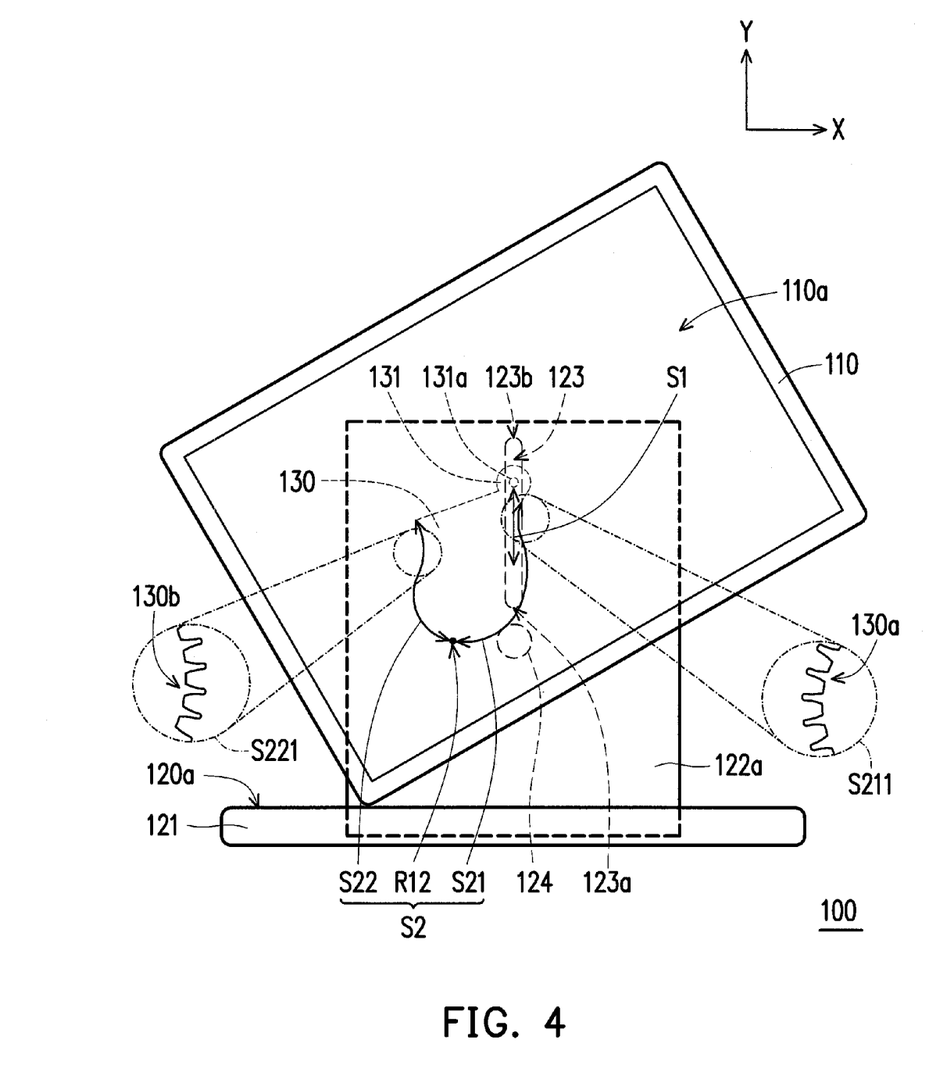
FIG. 4-FIG. 7 are schematic diagrams illustrating a process that the electronic device of FIG. 3 is transformed from a first state to a second state.

Moreover, referring to FIG. 4, the first segment S21 and the second segment S22 of the second stroke S2 respectively have a first buffer region S211 and a second buffer region S221, and the first buffer region S211 and the second buffer region S221 are all located away from the inflection point R12. In other words, during a process that the first body 110 is rotated relative to the second body 120 to transformed from the intermediate state to the first state or the second state, a relative moving speed of the second restriction member 124 at the first buffer region S211 or the second buffer region S221 is smaller than a relative moving speed of the second restriction member 124 at regions other than the aforementioned buffer regions, so as to mitigate a motion load between the components and reach a buffering and slowing effect similar to that of a damping structure.

In detail, as that shown in FIG. 4, the linking-up member 130 of the present embodiment has racks 130a and 130b respectively located at the first buffer region S211 and the second buffer region S221, and the second restriction member 124 has a corresponding gear structure (not shown), so that when the second restriction member 124 enters the first buffer region S211 or the second buffer region S221, the second restriction member 124 is respectively engaged to the racks 130a or 130b to achieve the slowing effect.

Figure 7:
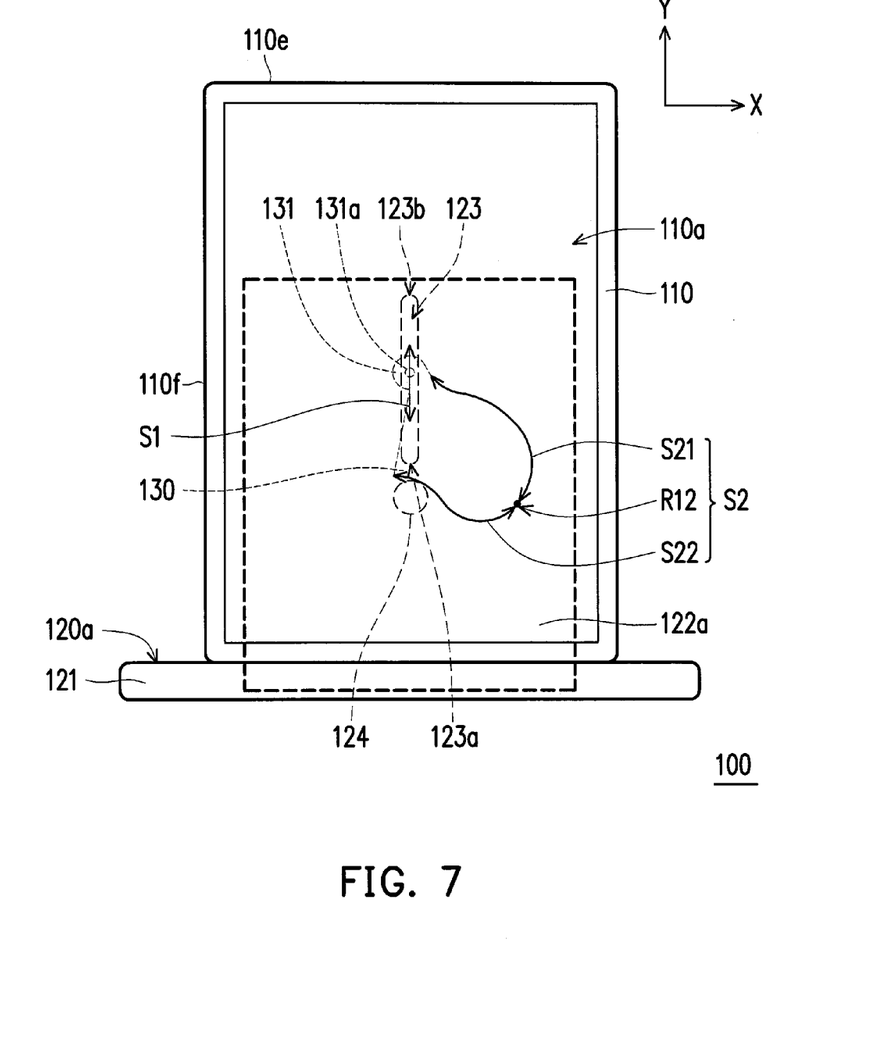

Referring to FIG. 3 and FIG. 7, in the present embodiment, when the first body 110 is in the first state relative to the second body 120, a long side 110e of the first body 110 is parallel to the surface 120a of the second body 120. Namely, when the first body 110 is in the first state relative to the second body 120, a display ratio (the X axial direction relative to the Y axial direction) of the display surface 110a of the first body 110 is approximately the same to a ratio between the long side 110e and a short side 110f of the first body 110, such that the first body 110 presents a landscape mode. On the other hand, when the first body 110 is in the second state relative to the second body 120, the long side 110e of the first body 110 is perpendicular to the surface 120a of the second body 120. In other words, when the first body 110 is rotated relative to the second body 120 by 90 degrees and is in the second state, a display ratio (the X axial direction relative to the Y axial direction) of the display surface 110a of the first body 110 is inversely proportional to the ratio between the long side 110e and the short side 110f of the first body 110, such that the first body 110 presents a portrait mode.

In summary, in the electronic device of the invention, the linking-up member is configured on the firsts body, where the linking-up member is respectively coupled to the first restriction member and the second restriction member on the second body. The first restriction member provides a first stroke, which is a linear path along which the linking-up member and the first body move up and down relative to the second body, and the contour of the linking-up member in collaboration with the second restriction member form the second stroke with the curved path. Therefore, when the first body is opened relative to the second body, the first restriction member is perpendicular to and located above the surface of the second body, where the first end is located between the surface and the second end, and the second restriction member is located between the surface and the first end. Therefore, the first body is adapted to withstand an external force to rotate about the rotation shaft along with the linking-up member, so as to drive the linking-up member to move relative to the first restriction member, and drive the shaft portion to slide back and forth along the first restriction member, such that the first body is changed between the first state and the second state relative to the second body.

In other words, when the user edits a document or browses a webpage, the user can change the first body from the first state to the second state to obtain a preferred display ratio, so as to obtain larger display content. On the other hand, in case that it is unnecessary to scroll the display page back and forth or greatly decrease the display ratio of the display page, the operation inconvenience is greatly improved and visual discomfort is mitigated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
   a first body;
   a second body, connected to the first body and capable of being opened and closed relative to the first body, and having a sliding slot;
   a linking-up member, fixed to the first body, and having a shaft portion pivoted to the sliding slot, wherein the first body rotates about a rotation shaft of the shaft portion relative to the second body along with and the linking-up member and moves along the sliding slot; and
   a restriction member, assembled to the second body, wherein the linking-up member is movably coupled to the restriction member according to a contour thereof, wherein the first body is applied with an external force to rotate about the rotation shaft along with the linking-up member, so as to drive the linking-up member to move relative to the restriction member, and drive the shaft portion to slide back and forth along the sliding slot, such that the first body is transformed between a first state and a second state relative to the second body,
   wherein the linking-up member is a cam, and at least a part of a curved contour of the cam movably leans against the restriction member to form a stroke for moving relative to the restriction member,
   wherein the stroke comprises a first segment and a second segment adjacent to each other and an inflection point between the first segment and the second segment, and
   wherein the first segment and the second segment respectively have a buffer region located away from the inflection point, and a relative moving speed of the restriction member at each of the buffer regions is smaller than a relative moving speed of the restriction member at regions other than the buffer regions.

2. The electronic device as claimed in claim 1, wherein the sliding slot has a first end adjacent to the restriction member and a second end away from the restriction member, when the linking-up member is rotated about the rotation shaft, and the restriction member moves from the first segment to the inflection point relative to the linking-up member, the shaft portion moves from the first end to the second end, and the first body is rotated to an intermediate state from the first state relative to the second body, and when the linking-up member is continually rotated about the rotation shaft, and the restriction member moves from the inflection point to the second segment relative to the linking-up member, the shaft portion moves from the second end to a position between the first end and the second end, and the first body is rotated to the second state from the intermediate state relative to the second body.

3. The electronic device as claimed in claim 1, wherein the restriction member is a gear, and the linking-up member has a rack at each of the buffer regions, such that the gear is engaged to the racks when entering the buffer regions.

4. The electronic device as claimed in claim 2, wherein when the first body is in the intermediate state relative to the second body, a diagonal of the first body is perpendicular to a surface of the second body.

5. The electronic device as claimed in claim 2, wherein the first body drives the shaft portion to move towards the first end from the second end through gravity, and makes the restriction member to move to the second segment from the inflection point.

6. The electronic device as claimed in claim 2, wherein the sliding slot is perpendicular to and located above a surface of the second body, the first end is located between the surface and the second end, and the restriction member is located between the surface and the first end.

7. The electronic device as claimed in claim 1, wherein when the first body is in the first state relative to the second body, a long side of the first body is parallel to a surface of the second body, and when the first body is in the second state relative to the second body, the long side of the first body is perpendicular to the surface of the second body.

8. The electronic device as claimed in claim 1, wherein orthogonal projections of the sliding slot and the restriction member on the first body are permanently located on a central axis of the first body.

9. An electronic device, comprising:
a first body;
a second body, connected to the first body and capable of being opened and closed relative to the first body, and having a first restriction member and a second restriction member; and
a linking-up member, assembled to the first body, and two opposite ends of the linking-up member being respectively coupled to the first restriction member and the second restriction member, wherein the first restriction member provides a first stroke to the linking-up member and the second restriction member provides a second stroke to the linking-up member, and one of the first stroke and the second stroke is a linear path and another one is a curved path, when the first body is opened relative to the second body, the linking-up member combines the first stroke and the second stroke to drive the first body to rotate relative to the second body,
wherein the first restriction member is a sliding slot, the second restriction member is a roller pivoted to the second body, and the linking-up member is a cam,
wherein the second stroke comprises a first segment, a second segment and an inflection point between the first segment and the second segment,
wherein the first segment and the second segment respectively have a buffer region located away from the inflection point, and a relative moving speed of the roller at each of the buffer regions is smaller than a relative moving speed of the roller at regions other than the buffer regions.

10. The electronic device as claimed in claim 9, wherein when the first body is opened relative to the second body, the sliding slot and the roller are located on a central axis of the second body, and orthogonal projections of the sliding slot and the roller on the first body are located on a central axis of the first body.

11. The electronic device as claimed in claim 9, wherein the cam has a shaft portion pivoted to the sliding slot for moving along the sliding slot, and at least a part of a contour of the cam movably leans against the roller;
wherein when the first body is opened relative to the second body, the sliding slot provides the linking-up member and the first body with the first stroke, which is the linear path that the linking-up member and the first body move up and down relative to the second body, and the contour of the linking-up member in collaboration with the roller form the second stroke in the curved path.

12. The electronic device as claimed in claim 11, wherein the sliding slot has a first end adjacent to the roller and a second end away from the roller, when the cam is rotated about the rotation shaft, and the roller moves from the first segment to the inflection point relative to the cam, the shaft portion moves from the first end to the second end, and the first body is rotated to an intermediate state from the first state relative to the second body, and when the linking-up member is continually rotated about the rotation shaft, and the roller moves from the inflection point to the second segment relative to the linking-up member, the shaft portion moves from the second end to a position between the first end and the second end, and the first body is rotated to the second state from the intermediate state relative to the second body.

13. The electronic device as claimed in claim 12, wherein when the first body is in the first state relative to the second body, a long side of the first body is parallel to a surface of the second body, and when the first body is in the second state relative to the second body, the long side of the first body is perpendicular to the surface of the second body, when the first body is in the intermediate state relative to the second body, a diagonal of the first body is perpendicular to the surface of the second body.

14. The electronic device as claimed in claim 9, wherein the roller has a gear structure, and the cam has a rack structure at each of the buffer regions, the gear structure is engaged to the rack structures to slow down a relative speed between the roller and the cam when the roller enters the buffer regions.

15. The electronic device as claimed in claim 12, wherein the first body drives the rotation shaft to move towards the first end from the second end through gravity, and makes the roller to move to the second segment from the inflection point.

16. The electronic device as claimed in claim 12, wherein when the first body is opened relative to the second body, the sliding slot is perpendicular to and located above a surface of the second body, the first end is located between the surface and the second end, and the roller is located between the surface and the first end.

* * * * *